(12) United States Patent
Tom et al.

(10) Patent No.: US 7,206,582 B2
(45) Date of Patent: Apr. 17, 2007

(54) METHOD, SYSTEM AND APPARATUS FOR CALL PATH RECONFIGURATION

(75) Inventors: Frank C. Tom, Ottawa (CA); Masilamany Raguparan, Dunrobin (CA); Alexander Markman, Thornhill (CA); Lloyd Williams, Ottawa (CA)

(73) Assignee: Newstep Networks Inc., Toronto, Ontario (CA)

( * ) Notice: Subject to any disclaimer, the term of this patent is extended or adjusted under 35 U.S.C. 154(b) by 148 days.

(21) Appl. No.: 11/020,225

(22) Filed: Dec. 27, 2004

(65) Prior Publication Data

US 2006/0142010 A1 Jun. 29, 2006

(51) Int. Cl.
*H04Q 7/20* (2006.01)
*H04M 3/42* (2006.01)

(52) U.S. Cl. .................... 455/445; 379/211.01
(58) Field of Classification Search ........... 455/445, 455/3.02, 414.4, 432.2, 461; 379/211.01, 379/221.08, 211.04, 207.02, 207.16, 221.12, 379/229, 230
See application file for complete search history.

(56) References Cited

U.S. PATENT DOCUMENTS

| | | | |
|---|---|---|---|
| 5,497,414 A | 3/1996 | Bartholemew | ............ 379/142 |
| 6,226,289 B1 | 5/2001 | Williams et al. | ............ 370/385 |
| 6,337,858 B1 | 1/2002 | Petty et al. | ................. 370/356 |
| 6,385,191 B1 | 5/2002 | Coffman et al. | ............ 370/352 |
| 6,654,807 B2 | 11/2003 | Farber et al. | ............... 709/225 |
| 6,724,876 B2 | 4/2004 | Williams et al. | ....... 379/207.02 |
| 6,978,004 B1* | 12/2005 | Levine | .................. 379/211.04 |
| 2003/0123631 A1* | 7/2003 | Moss et al. | ............ 379/210.02 |
| 2004/0037409 A1* | 2/2004 | Crockett et al. | ....... 379/210.02 |
| 2004/0141508 A1 | 7/2004 | Schoeneberger et al. | |
| 2005/0164707 A1* | 7/2005 | Batni et al. | ................. 455/445 |

OTHER PUBLICATIONS

Patent Abstracts of Japan, Publication No. 2004129184, Published Apr. 22, 2004; Saito Tatsuaki.

* cited by examiner

*Primary Examiner*—Naghmeh Mehrpour
(74) *Attorney, Agent, or Firm*—Kent Daniels; Ogilvy Renault LLP

(57) ABSTRACT

A method, apparatus and system for reconfiguring communications call paths enables more efficient use of communications network resources and enhanced service offerings. A plurality of feature control points (FCPs) located in a plurality of different types of communications carrier networks are controlled by a single call service node (CSN). The CSN receives a report from a FCP each time the FCP receives a call control signaling message. The CSN uses the reports to map the call path, so that when a connection change request is received, the CSN can select which of the FCPs to use to effect the requested change based on predetermined criteria.

20 Claims, 9 Drawing Sheets

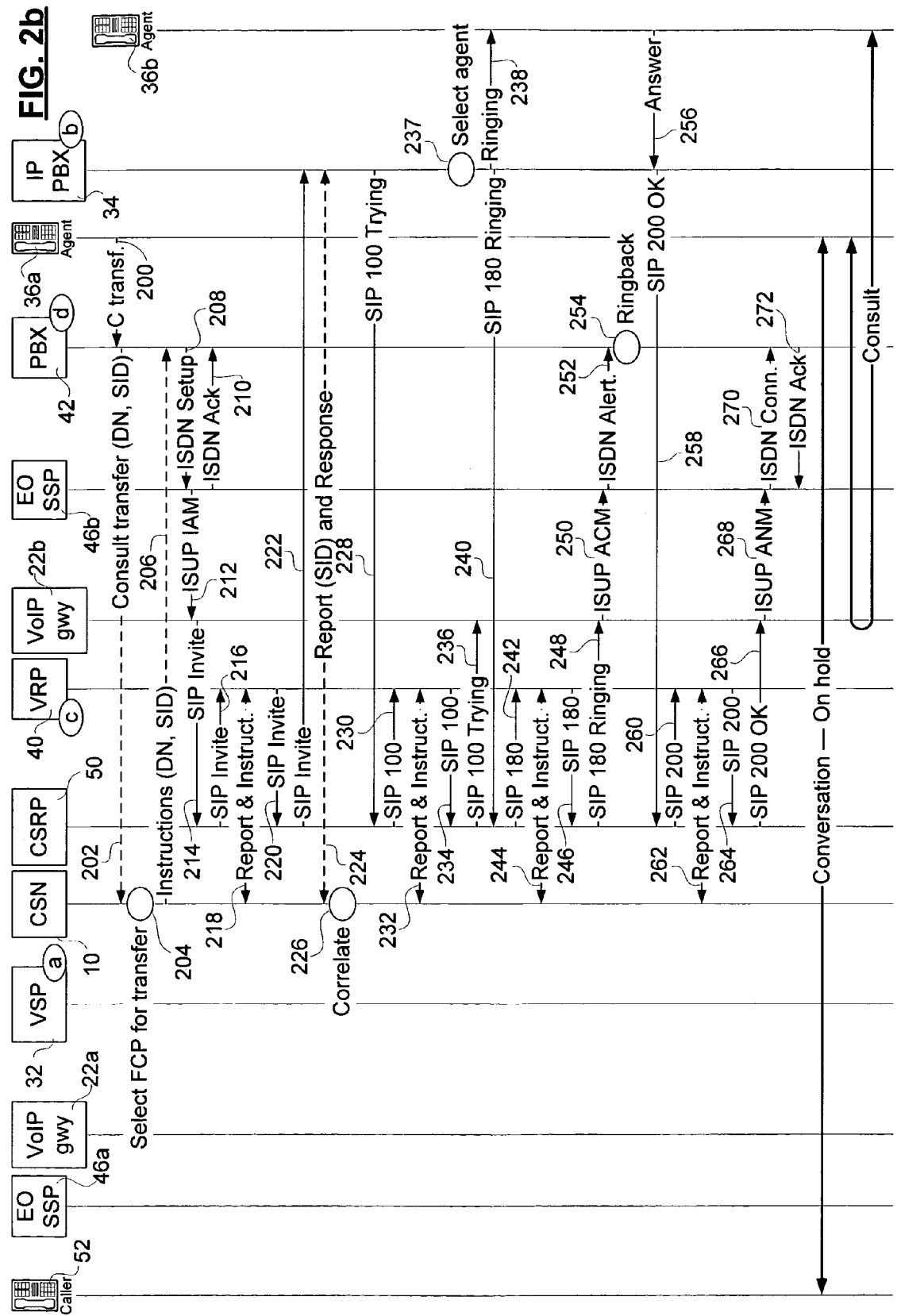

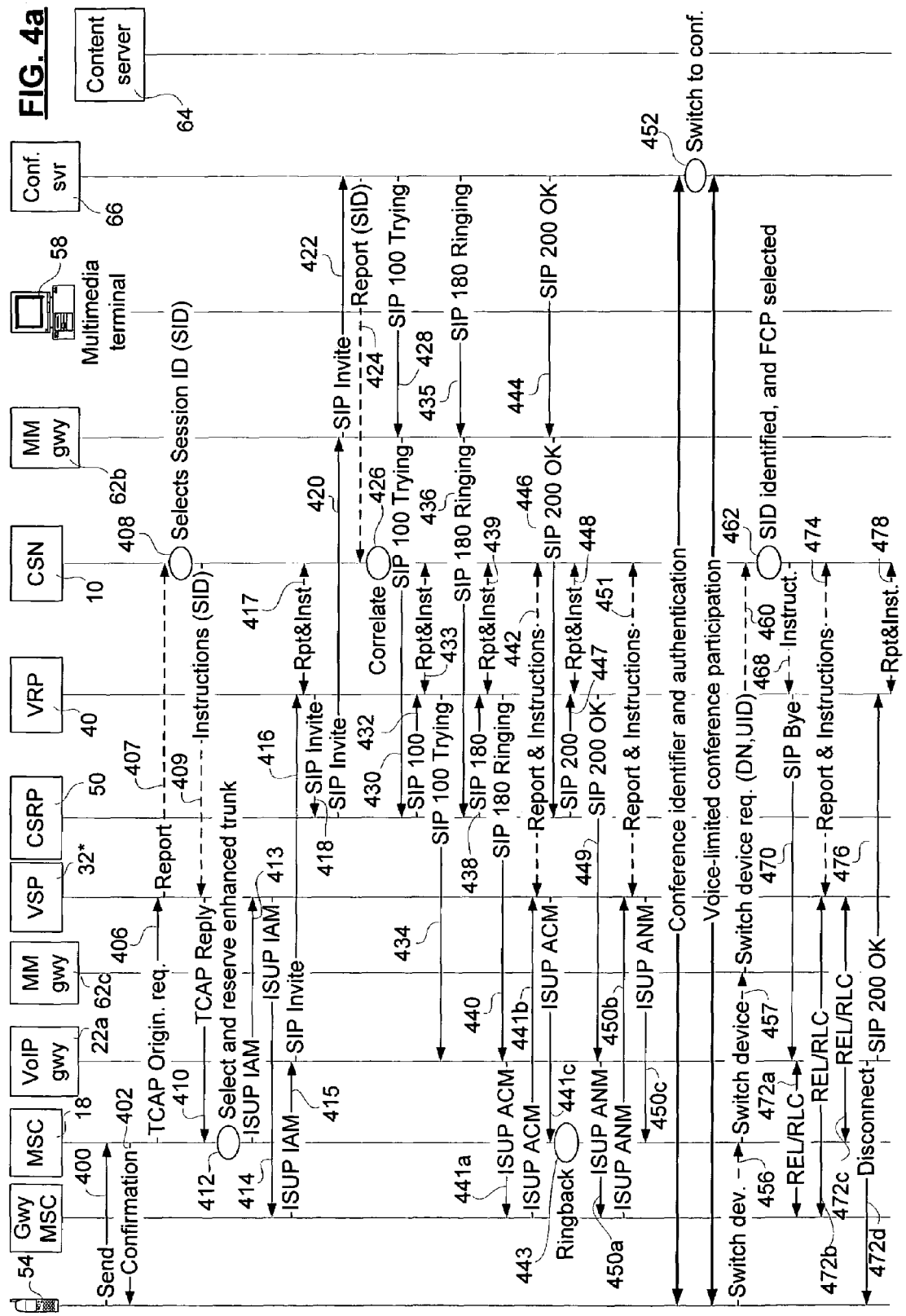

METHOD, SYSTEM AND APPARATUS FOR CALL PATH RECONFIGURATION

CROSS-REFERENCE TO RELATED APPLICATIONS

This is the first application filed for the present invention.

MICROFICHE APPENDIX

Not Applicable.

TECHNICAL FIELD

The present invention relates in general to telephone communications services, and more particularly to a method and apparatus for reconfiguring call paths within a communications network.

BACKGROUND OF THE INVENTION

Advanced communications services that permit the reconnection of telephone and multimedia calls during setup and/or after the calls are established, are known in the art and have been successfully deployed to provide subscribers with services that are currently in demand. These advanced communications services are provided using a variety of equipment in a variety of configurations.

For example, a virtual switching point or an intelligent signal transfer point can be used as taught in U.S. Pat. No. 6,226,289 to permit the disconnection of a leg of a call path and the subsequent establishment of a different leg for the call in accordance with a subscriber request. There are other mechanisms for effecting similar services using specially provisioned service switching points (SSPs) (for example, with advanced intelligent network (AIN) enabled SSPs), intelligent peripherals, voice over Internet Protocol (VoIP) communications equipment, and inter-exchange carrier network equipment.

However, carrier networks have evolved to include a complex of different interconnected communications networks with gateways that permit calls to originate in one-type network and terminate in another or traverse another type of network which is different from the network in which the call originated and/or terminated. Although the services described above permit reconfiguration of calls within a given type of network, efficient utilization of complex interconnected telecommunications networks requires a larger view of calls to permit efficient utilization of network resources across different types of networks.

With the increasing load on telecommunications equipment, there is a need for improved efficiency of resource utilization in communications networks switching calls across interconnected carrier networks of different types.

SUMMARY OF THE INVENTION

It is therefore an object of the invention to provide a method and a system for improving the efficiency of resource utilization and enhanced services in communications networks of different types when reconfiguring calls.

BRIEF DESCRIPTION OF THE DRAWINGS

Further features and advantages of the present invention will become apparent from the following detailed description, taken in combination with the appended drawings, in which:

FIG. 2b is a schematic message flow diagram illustrating principal message and processing steps involved in establishing a second call between the agent and a remote agent, using the system shown in FIG. 1;

FIGS. 4a and 4b are a schematic message flow diagram illustrating principal message and processing steps involved in effecting a user equipment transfer method for effecting a multimedia conference transfer using the system shown in FIG. 3.

It should be noted that throughout the appended drawings, like features are identified by like reference numerals.

DETAILED DESCRIPTION OF THE PREFERRED EMBODIMENT

The present invention enables a selection of one of a plurality of feature control points (FCPs) located in interconnected communications networks of different types for effecting a requested change in connections of a call setup through the communications networks. A call service node (CSN) exercises control over each FCP. The CSN receives and correlates reports sent by the FCPs to map the respective FCPs to a call control path associated with each call. The identification of the call paths may be accomplished using a session identifier carried by call signaling messages used to establish the call paths.

Voice Communications Embodiment

Figure 1:
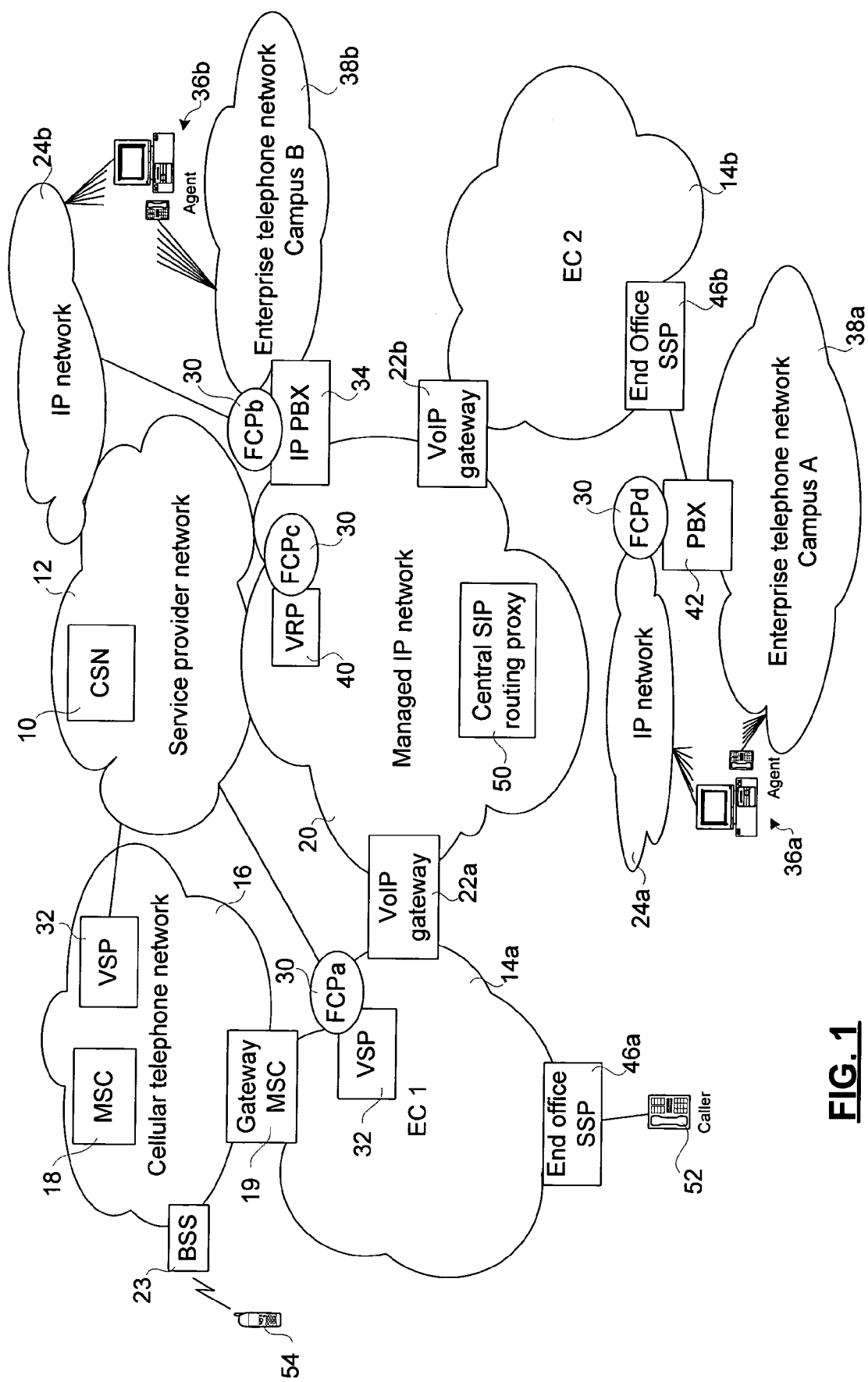
FIG. 1 is a schematic diagram illustrating an embodiment of a system in accordance with the present invention deployed in exemplary interconnected communications networks of different types.

FIG. 1 schematically illustrates a system in accordance with an embodiment of the present invention deployed in exemplary interconnected networks through which voice calls are routed. The system includes a call service node (CSN) 10, which is, for example, a server in a service provider's network 12. The service provider network 12 may be managed by or for an enterprise with geographically distributed contact centers (as shown), or may be operated to provide service to one or more voice communications networks, or to provide service to one or more service providers that manage one or more feature control points (FCPs) 30, or to end users that are provided with one or more feature control points.

Two exchange centers (ECs) 14 (EC1, EC2) are shown in FIG. 1, as well as a cellular telephone network 16, all three of which provide voice call service to respective wireline and wireless subscribers. The cellular telephone network 16 is coupled to EC1 via a gateway mobile switching center (MSC) 19. The ECs 14 are interconnected by an interexchange carrier (IXC) network, which in this exemplary embodiment is a managed IP network 20. The ECs 14 and cellular telephone network 16 include a bearer traffic layer (bearer trunks) that carries voice/data traffic between two or more terminations, and a call control signaling layer for exchanging call control signaling messages used to establish, maintain, and tear down bearer traffic connections supported by the bearer trunks.

The managed IP network 20 supports voice over Internet Protocol (VOIP) telephony, and may provide bearer channels of predefined latency, loss rate, etc. for carrying voice/data traffic between VOIP gateways 22 within the managed IP network 20. The managed IP network 20 further provides a signaling framework that permits the exchange of call control signaling messages for the establishment, maintenance and tear-down of connections set up through the managed IP network 20.

The call control signaling messages within the managed IP network 20 conform with a protocol that interworks with a common channel signaling system 7 protocol well known in the art. In the following description, implementations using the session initiation protocol (SIP) messages for call control signaling are described, however it will be appreciated that media gateway control protocol (MGCP), H.323 protocol, H.248(MEGACO) or other protocols could alternatively or additionally be used in other embodiments of the invention. The VoIP gateways 22a, 22b are configured to selectively interconnect circuit switched call legs originating or terminating within respective ECs 14a, 14b with bearer channels provided through the managed IP network 20, and to convey the call control signaling messages associated with those call legs, in accordance with well known interworking protocols.

The service provider network 12 and various other IP networks (such as IP networks 24a, 24b that are managed for or by the enterprise) are interconnected by various gateways in a manner known in the art. The service provider network 12 and the CSN 10 are accessible via the Internet.

Feature Control Points

In accordance with the invention, the CSN 10 is configured to exchange messages with a plurality of feature control points (FCPs) 30 that keep the CSN 10 informed about call control paths and call states associated with calls made to or from the enterprise network 38a, 38b. Although in this example feature control points are described with reference to an enterprise network, a feature control point can also be associated with any intelligent terminal, such as a cellular telephone, an IP telephone, a home gateway, etc. For calls with call control paths that pass through multiple FCPs 30, the CSN 10 is informed about the call control path at multiple points, and each of the FCPs 30 can be controlled by the CSN 10 to effect changes to connections associated with the call.

In some embodiments of the FCPs 30, all call control signaling messages received by a FCP 30 are forwarded to the CSN 10, while in other embodiments only those call control signaling messages that meet at least one specified criterion are sent to the CSN 10. It should further be understood that the CSN 10 can request the FCPs 30 to receive at least relevant parts of the call control signaling messages associated with certain calls. Herein, a FCP 30 is any software/hardware that is effectively within a call control path and can generate call control signaling messages, selectively forward call control signaling messages that are automatically forwarded by other network elements in the course of normal call processing, and modify a call control signaling message before forwarding it. Some FCPs 30 are further adapted to control telephone conference bridging, control a listening device in a bearer channel of the network, and/or provide other services, such as generating billing records.

The FCPs 30 shown in FIG. 1 include: FCPa, a virtual switching point (VSP) 32 in EC1, for which the CSN 10 provides service logic; FCPb, an Internet Protocol (IP) private branch exchange (IP PBX) 34 that permits the distribution of telephone calls to a plurality of contact center agents (like agent 36b) connected to the enterprise telephone network 38b (campus B); FCPC, a virtual routing point (VRP) 40 in the managed IP network 20; and FCPd, a PBX 42 that is coupled to the EC2 for switching calls to employees and call center agents 36a at a campus A of the enterprise telephone network 38a (in larger enterprise telephone networks, a TDM switch may be used in place of the PBX42).

Circuit Switched FCPs

As is known in the art, the circuit switched ECs 14 consist of service switching points (SSPs) including end office SSPs 46a, 46b and tandem SSPs, which control trunk facilities that convey voice traffic between SSPs, in response to subscriber line activities and call control signaling messages. Signal transfer points (STPs) route the call control signaling messages, but do not generally modify a content of the call control signaling messages. Calls established through ECs 14 pass through one or more SSPs that link the trunk facilities for the call, and a call control path for the call passes through SSPs, STPs, and other call control signaling nodes that control the call path.

The VSP 32 is a virtual switch, in that it has an interface for receiving call control signaling messages and has a point code like SSPs, but, unlike SSPs, does not have a switch fabric. The VSP 32 is in the call control signaling path of all calls associated with a predefined set of trunks (enhanced trunks) or trigger detection points used to route calls to the enterprise networks 38a, 38b, for example.

In one embodiment the VSP 32 is a call control signaling message delivery mechanism with minimal service logic, and an interface through which it is coupled to a call control application (such as the CSN 10), which controls calls using the VSP 32. The operation of the VSP 32 is described in applicant's U.S. Pat. No. 6,226,289, which is incorporated herein by reference.

Customer Premise Equipment FCPs

It is also well known in the art of PBXs, IVRs and private TDM networks that provide an enterprise call application (for example, a computer telephony interface (CTI) or other IP-based interfaces well known in the art) with service logic for controlling customer premises equipment. Numerous call service features are possible using PBX 42 or IP PBX 34 well known in the art, including conference bridging of voice calls. The PBX 42 and IP PBX 34 can also serve as FCPs 30. In some embodiments the CSN 10 serves as an enterprise application that directly controls both the PBX 42 and IP PBX 34. Alternatively, the PBXs 34, 42 communicate with the CSN 10 as required to effect connection changes requested for selected calls, such as only calls associated with a session identifier (SID).

Packet Switched FCPs

Within the managed IP network 20, bearer channels are typically established using a protocol such as real-time transfer protocol (RTP), which supports quality of service features. The bearer channels are typically established between the VoIP gateways 22a, 22b prior to call establishment within circuit switched networks, and simply assigned to individual calls as required. There is a great deal of flexibility in the provisioning of routing of both bearer channels and the call control signaling channels in managed IP networks. A typical implementation that simplifies network management is described below.

In the managed IP network 20 packets are exchanged by routers. In accordance with the illustrated embodiment, the call control signaling messages received at VoIP gateways 22a, 22b are forwarded to a central SIP routing proxy (CSRP) 50. The CSRP 50 is provisioned to forward all call control signaling messages that meet at least one predefined criterion to a virtual routing point (VRP) 40, which has a reliable link to the CSN 10. The CSN 10 provides service logic to the VRP 40 in analogous manner to the way it provides service logic to VSPs 32.

In one embodiment, each VoIP gateway 22a, 22b is associated with a SIP proxy that receives and forwards the call control signaling messages in a SIP-encoded packet format. These SIP proxies forward the call control signaling messages to the CSRP 50. There may be multiple CSRPs, in which case the call control signaling messages may be forwarded to one of the CSRPs in dependence on some characteristic of the call control signaling message. Depending on a size of the managed IP network 20 and a capacity of the CSRP 50, the call control signaling message may be routed to one or more other CSRPs before being forwarded to a VoIP gateway.

All call control signaling messages associated with calls that meet a predefined criteria are routed to the VRP 40 by the CSRP 50. This is achieved, in the illustrated embodiment, by configuring the VRP 40 as a back-to-back user agent. The call control signaling message is forwarded by the CSRP 50 to the VRP 40, which returns the call control signaling message to a CSRP, which may be CSRP 50 or a different CSRP. The CSRP then routes the packet towards the (egress) VoIP gateway 22a or 22b.

In other embodiments the SIP proxies of the VoIP gateways 22a, 22b include logic for determining whether a call control signaling message is to be routed through the VRP 40, and the SIP proxies forward the signaling messages directly to the VRP 40. In response, the VRP 40 reports receipt of each call control signaling message to the CSN 10, and then forwards the call control signaling message to the CSRP 50, where it is routed to the relevant egress node (e.g. VoIP gateway 22a, 22b or IP PBX 34).

It will be appreciated by those skilled in the art that these examples of how the call control signaling messages are routed through the managed IP network 20 are exemplary only, and that other implementations can be effected by provisioning routers of the managed IP network 20 differently.

Call Services Node (CSN)

The CSN 10 provides service logic for maintaining a map of FCPs 30 in each call control path, and for receiving connection change requests from subscribers to effect reconfiguration of the call. The service logic may be encoded as program instructions stored in a memory, or encoded on a computer readable modulated carrier signal. In order for the CSN 10 to maintain the map of FCPs 30 in each call control path, the FCPs 30 are provisioned to report to the CSN 10 each time a call control message is received. The CSN 10 uses these reports to map the call control path and maintain a call state for each of the reported calls. Tracking the various calls can be accomplished in several ways, but in one embodiment a session identifier (SID) is assigned to each call and inserted in the call control messages. One way to accomplish this is for a first FCP 30 in the call control path to insert the SID in the call control message. The assignment of the SID can be handled in different ways. If the first FCP 30 is configured to receive service logic instructions from the CSN 10, the SID may be bundled with the service logic instructions.

The SID may be randomly selected from a large set of SIDs; the SID may include a number uniquely associated with the FCP; or the FCP may receive the SID from the CSN 10 (either in a batch that the FCP stores, or is requested upon receipt of a call).

Once a SID is assigned to a call, it is inserted in the call control signaling messaging used to establish the call so that each switch/router in the call control path receives and forwards the SID containing call control signaling messages. The FCPs 30 in the call control path include the SID in reports sent to the CSN 10 to permit the CSN 10 to map the call control path through the reporting FCPs 30. As already explained, there are different call control signaling message protocols used in different segments of the public voice network (e.g. transaction capabilities application part (TCAP); integrated services digital network (ISDN); ISDN-user part (ISUP); ISUP+ (also called bearer independent call control (BICC)); H.323; SIP; and MGCP). There are various mechanisms for including a SID in call control signaling messages used in different parts of the public telephone network. For example, an optional user-to-user information (UUI) field in ISUP initial address messages (IAMs) can be used to transport the SID through most of the circuit switched public telephone network, and in SIP domains, a session.telephone.uui script in a SIP Invite message body (or a multipart extension thereto) may be used to transmit the SID. Other fields in call control signaling messages of the same or other protocols can also be used to achieve the same result. Suitable fields can be selected by a person skilled in the art for different embodiments. Gateways between the various protocol segments of the public telephone network map content of various corresponding fields, including the user-to-user information fields, in a manner well known in the art.

By the time a call is established, the CSN 10 has constructed a map of all FCPs 30 within the call control path. Upon receipt of a connection change request associated with the call, (using the SID, or calling/called party information supplied by a party to the call, for example) the CSN 10 identifies the FCPs 30 within the call path, determines capabilities of the FCPs 30 (if necessary), and selects a FCP 30 for effecting the requested connection change. The selection of an appropriate FCP 30 can be based on any number of agreements between the service provider network 12 and various owners of the FCPs 30, telephone networks, the enterprise, or other interested party, and may generally optimize cost or resource utilization for any one or more of the above parties. As such, each FCP 30 in a call may be associated with a cost of reconnecting the call from the FCP 30.

The managed IP network 20 interworks with the ECs 14 to support calls between telephone service subscribers (such as caller 52, cellular telephone user 54, and contact center agents of the enterprise telephone network 38).

Example Service Deployment

Call Setup

Figure 2A:
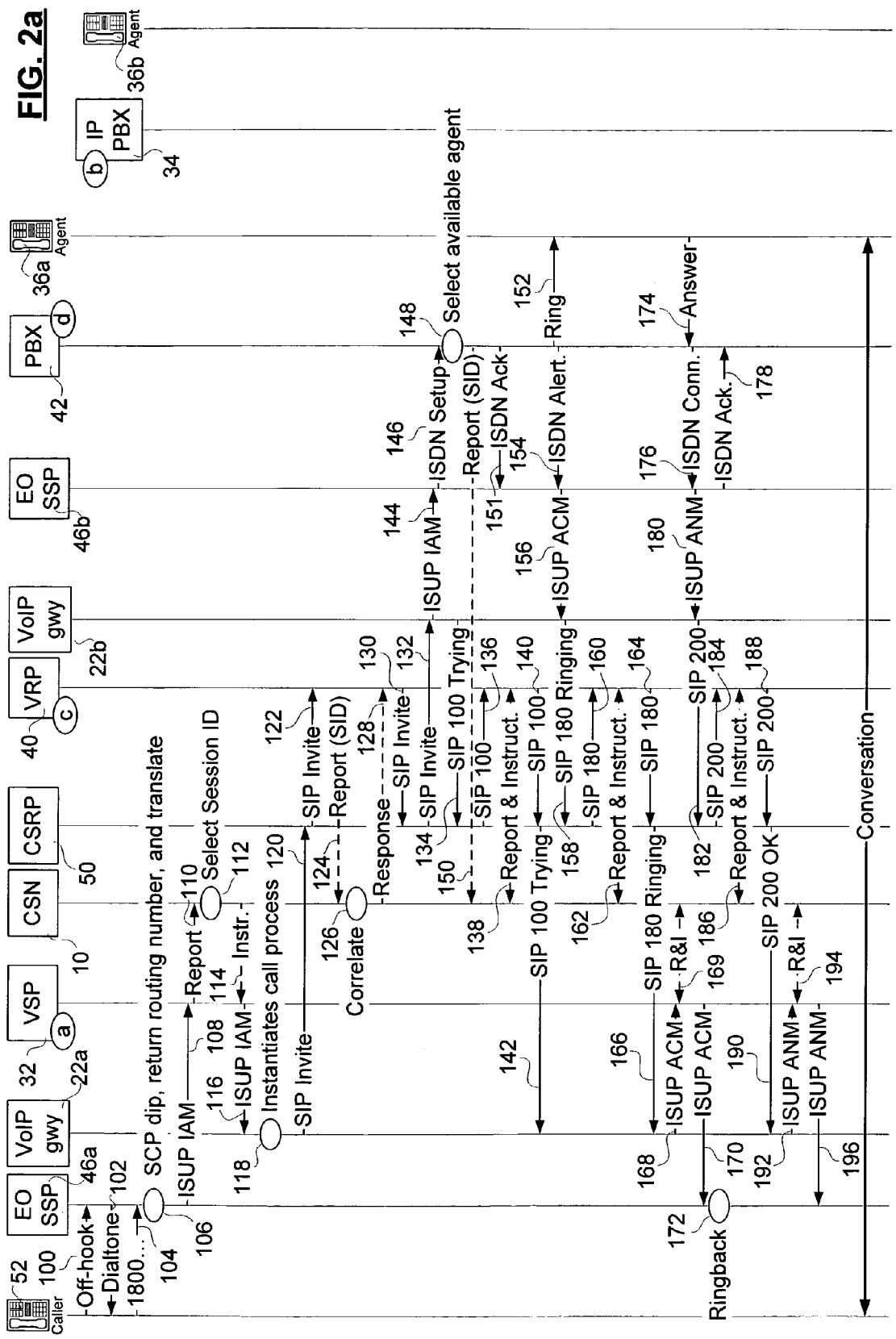
FIG. 2a is a schematic message flow diagram illustrating principal message and processing steps involved in establishing a telephone call path between a caller and an agent through multiple feature control points in accordance with the embodiment of the system shown in FIG. 1.

FIG. 2a is a call flow diagram illustrating principal steps involved in establishing a call between a caller 52 and a contact center agent 36a in accordance with an exemplary service deployment in accordance with the embodiment of the invention shown in FIG. 1. Some of the components of the system shown in FIG. 1 that are in the bearer path or call control path of the call are not illustrated in FIG. 2a.

In step 100 a caller takes telephone 52 off-hook, causing the end office SSP 46a serving the telephone 52 to detect the off-hook condition, and apply a dial tone to a subscriber line connecting the telephone 52 to the end office SSP 46a (step 102). The caller then dials a toll-free directory number (1-800 . . . ) published by the enterprise (step 104). The end office SSP 46a, in step 106, receives the dialed digits, determines that the call is of a 1-800 type, and consequently queries a service control point (SCP) in a manner well known in the art using a transaction capabilities application part (TCAP) message in accordance with the SS7 protocol. Upon receipt of a TCAP reply, the end office SSP 46a translates a returned routing number to identify an outbound trunk group for the call. A trunk is reserved for the call, and, in step 108, an ISUP IAM is forwarded to an SSP at the other end of the reserved trunk. In the illustrated example, the reserved trunk is an enhanced trunk, so the ISUP IAM is forwarded to the VSP 32. The IAM may be forced over the enhanced trunk in other ways that do not include a 1-800 routing query. For example, an interexchange carrier identifier included in the IAM may be used for routing the IAM in a manner known in the art.

Upon receipt of the IAM, the VSP 32 forwards at least part of the content of the IAM to its associated call control application, which, in this example, is the CSN 10 (step 110). Accordingly, the IAM (or at least the part of the content thereof) is included in a report of a pre-determined format that is sent in a data packet to the CSN 10 (step 112). A low latency communications path is provided between the CSN 10 and the VSP 32 (and the other FCPs 30) so that call setup is not noticeably delayed. If there is no SID included in the UUI field of the IAM received at the VSP 32, the CSN 10 is programmed to generate or select a SID for the call. No service feature is applied to the call by the CSN 10 at this point, and so the CSN 10 instructs the VSP 32 to forward the IAM with the SID inserted in the UUI field (step 114). The VSP 32 forwards the IAM (step 116) to a next SSP at the opposite end of the enhanced trunk reserved by the previous SSP in the call path. The next SSP, in turn, forwards the IAM, and hop-by-hop the call path is reserved for the call within EC1, until the call is received at VoIP gateway 22, which interconnects EC1 and the managed IP network 20.

Upon receipt of the IAM (step 116), the VoIP gateway 22 instantiates a state machine for the call (step 118), which prompts the VoIP gateway 22 to issue a SIP Invite call control signaling message in a packet (e.g. via a SIP proxy). The invite is forwarded to the CSRP 50, which routes the invite message to the VRP 40 (step 122). The VRP 40 reports to the CSN 10. The report message may have a format similar to the report sent by the VSP 32 (step 124). The CSN 10 extracts the SID, and maps the VRP 40 to the call control path passing through the VSP 32 (FCPa), adding the VRP 40 to the call path map (step 126). The CSN 10 then returns instructions to the VRP 40 to continue call setup by forwarding the invite message (step 128). The VRP 10 updates an overhead of the packet and returns it to the CSRP 50 (step 130).

The update of the overhead indicates to the CSRP 50 that the call has been sent to the back-to-back user agent (VRP 40), and should now be routed toward an egress node (in this case VoIP gateway 22b to EC2). In step 132 the egress VoIP gateway 22 receives the call control signaling message, and establishes a state machine for the call. The VoIP gateway 22 acknowledges the invite by sending a SIP 100 Trying call control message, which retraces the call control path within the managed IP network 20. The SIP 100 Trying message is received at the CSRP 50 in step 134, and is relayed to the VRP 40 (step 136), which requests instructions from the CSN 10 (step 138). Upon receipt of the instructions, the SIP 100 Trying message is returned to the CSRP 50 in step 140, where it is relayed to the VoIP gateway 22b (step 142).

On the EC2-side, the VoIP gateway 22b translates the called party number field of the SIP Invite message (which contains the routing number) and reserves a trunk, as per normal call processing. Subsequently, VoIP gateway 22 formulates and sends an IAM containing the SID in the UUI field to an SSP connected to the other end of the reserved trunk (step 144).

In an abbreviated manner, FIG. 2a shows the call path reservation through the EC2, which may require IAMs to be forwarded to at least one tandem SSP within EC2. The IAM sent in step 144 is forwarded to an SSP that translates the IAM, and forwards it. This repeats until the IAM is received at the end office SSP 46b serving the PBX 42. The end office SSP 46b identifies the routing number as local, and forwards ISDN call control signaling messages over a leased trunk to the PBX 42. More specifically, the end office SSP 46b forwards an ISDN setup message over the leased trunk to the PBX 42 (step 146). The PBX 42 receives the ISDN setup message, and selects an available agent for the call (step 148). The PBX 42 reports its presence within the call control path to the CSN 10 (step 150), including the SID found in the ISDN setup message. The CSN 10 maps the call path through the PBX 42 using the SID (step not shown).

In step 151, the PBX 42 acknowledges the ISDN setup message, and effects ringing of the telephone of a selected available agent, agent 36a (step 152). An ISDN Alerting message is returned by the PBX 42, when the call is ringing (step 154), prompting the end office SSP 46b to return an ISUP Address Complete message (ACM) (step 156) back along the call path through EC2. The ACM is relayed hop-by-hop through the call control path through EC2 until it reaches VoIP gateway 22, which converts the ACM to a SIP 180 Ringing message, and relays the SIP 180 Ringing message along the call control path through the managed IP network 20. In step 158 the SIP 180 Ringing message is sent to the CSRP 50 where it is relayed to the VRP 40 (step 160), which reports to the CSN 10 (step 162) (a report and a return of instructions), back to the CSRP 50 (step 164), and on to VOIP gateway 22a (step 166). The VoIP gateway 22a converts the call control signaling message into an ISUP ACM, and sends the ACM to the previous switch in the call control path within EC1. The ACM is relayed to the VSP 32 in step 168, which reports to the CSN 10 (step 169) and subsequently relays the ACM through the call path in EC1. In step 170 the ACM is received at the end office SSP 46a serving the caller 52, and ringback is applied to the caller's subscriber line (step 172).

In step 174, the agent 36a answers the call, which is detected by the PBX 42. The PBX 42 sends an ISDN connect message to the end office SSP 46b (step 176), which is acknowledged in step 178. A similar cascade of call control signaling messages are sent back along the call control path (steps 180–196). In step 180 ISUP answer messages (ANMs) are forwarded hop-by-hop through EC2; in steps 182–190 SIP 200 OK messages are relayed along the call control path through the managed IP network 20, and in steps 190–196 ANMs are forwarded through the EC1 to the end office SSP 46a serving the caller (with the reports to CSN 10 from the VRP 40 and VSP 32). The call path is now in service and a conversation between the agent 36a and the caller is enabled.

Conference

The starting point of FIG. 2b is a two party call established between the caller and agent 36a, as per the conclusion of FIG. 2a. The call established between the caller 52 and the agent 36a is subject to a connection change requested by the agent 36a, in order to permit the agent 36a to consult with a remote agent 36b, while placing the caller 52 on hold. Such a connection change is commonly referred to as a "consult transfer", and happens in two parts: in a first part the consult call path is established (shown in FIG. 2b); and in a second part, the transfer releases the agent 36a from the call (shown in FIG. 2c).

In step 200 the agent requests a consult transfer connection change from the PBX 42, placing the caller on hold. As will be appreciated by those skilled in the art, there are numerous ways that this request can be sent to the CSN 10. The illustrated embodiment shows the PBX 42 (which is provisioned with the FCP functionality for effecting the communications with the CSN 10, enabling the FCPd) receives a conference request from agent's telephone. More specifically dual tone multi-frequency (DTMF) signals or other parallel, proprietary signaling associated with a function key of the telephone, may be used. It should further be noted that if the call between the agent and caller passes through a listening device in the bearer path, another device can receive the DTMF pulses retrieved by the listening device from the bearer path and send the connection change request to the CSN 10, as taught in Applicant's U.S. Pat. No. 6,724,876 entitled METHOD AND APPARATUS FOR EFFECTING TELECOMMUNICATIONS SERVICE FEATURES USING CALL CONTROL INFORMATION EXTRACTED FROM A BEARER CHANNEL IN A TELECOMMUNICATIONS NETWORK, which is incorporated herein by reference.

It will further be appreciated that in some embodiments the connection between the agent's telephone and the PBX 42 is not used to request the connection change, but rather a networked computer of the agent is used for this purpose. For example the agent's computer may be provisioned with program instructions for instructing the enterprise call application of the PBX 42 to request the PBX 42 to send the connection change request, which includes the SID for correlating the connection change request with the call. Alternatively, the connection change request may be sent directly by the networked computer to the CSN 10, and may either obtain the SID from IP PBX 34, or identify the call path to be changed in some other way.

In this example, the PBX 42 formulates and sends the connection change request to the CSN 10 (step 202), the connection change request including the SID (or other identifier of the call path), and an identifier of the party with which the agent 36a wishes to consult (for example, a directory number (DN) or a termination address). The CSN 10 determines which of the FCPs 30 in the call path is to be used to effect the consult connection. Any conference facility within reach of any of the FCPs 30 in the call path could be used for effecting this connection change, for example, by separating the call path into two legs and reconnecting each leg to a conference facility. However, the CSN 10, by applying a predefined criterion to the connection change request (step 204), determines that the PBX 42, is to be used for effecting the consult transfer. The selection of the PBX 42 for effecting the consult operation may be guided, for example, by the enterprise's desire to maximally leverage the capabilities of the PBX 42 in order to incur the fewest charges for conference services provided within the telephone networks. Accordingly, the CSN 10 issues instructions to the PBX 42 (step 206), directing the establishment of the consult call.

In response, the PBX 42 issues an ISDN setup message (step 208) to the end office SSP 46b, which acknowledges the ISDN setup message (step 210) and forwards an ISUP IAM through EC2, which is relayed to VoIP gateway 22b in step 212. The VoIP gateway 22b converts the IAM into a SIP Invite message, and forwards the SIP Invite message through the managed IP network 20 to the CSRP 50 (step 214). The SIP Invite message is relayed to the VRP 40 (step 216) permitting the VRP 40 to report to the CSN 10 (step 218) using the same SID that was used in FIG. 2a, so that the CSN 10 can map the FCPc to the call path (step not shown). The reply to the VRP 40 instructs the return of the SIP Invite message to the CSRP 50 (step 220), where it is forwarded to IP PBX 34 (step 222).

The IP PBX 34 responds to the SIP Invite message by reporting to the CSN 10, indicating its position within the call path (step 224), permitting the CSN 10 to map the IP PBX 34 (FCPb) to the call path (step 226), and in step 228 acknowledges the SIP Invite message with a SIP 100 Trying message. The SIP 100 Trying message cascades through the call signaling path within the managed IP network 20 in a now familiar manner, in steps 230–236.

In step 237 the IP PBX 34 selects an agent for the consult call, applies ringing to the selected agent's (agent 36b) telephone (step 238), and formulates a SIP 180 Ringing message. The SIP 180 Ringing message is relayed back through the call signaling path within the managed IP network 20 (steps 240–248), where VoIP gateway 22 converts it into an ACM, and forwards the ACM through EC2 to the end office SSP 46b (step 250), where the ACM is converted into an ISDN Alerting message and sent to the PBX 42. The PBX 42 applies ringback to the call and the agent 36a is alerted to the ringing of the remote agent's telephone (step 254).

When the remote agent 36b answers the call in step 256, the IP PBX 34 detects the answer, uses a bearer channel to the VoIP gateway 22 (to EC2) for the call, and sends a SIP 200 OK message to the CSRP 50 (step 258). The SIP 200 OK message is forwarded through the managed IP network 20 along the call signaling path (steps 260–266) until it is received at the VoIP gateway 22, where the SIP 200 OK message is converted into an ISUP ANM, and relayed through EC2 (step 268), until it reaches the end office SSP 46, and is converted into an ISDN Connect message (step 270). When the ISDN Connect message is acknowledged in step 272, the establishment of the consult call leg is complete.

Transfer

The agents 36a and 36b consult with each other while the caller 52 is on hold. The agent 36a may at any time switch the call to a conference mode by issuing a conference connection change request to the PBX 42; release the call path to the agent 36b, if the remote agent 36b has provided information required by the agent 36a; or, place the agent 36b on hold while agent 36a confers with the caller 52.

Figure 2C:
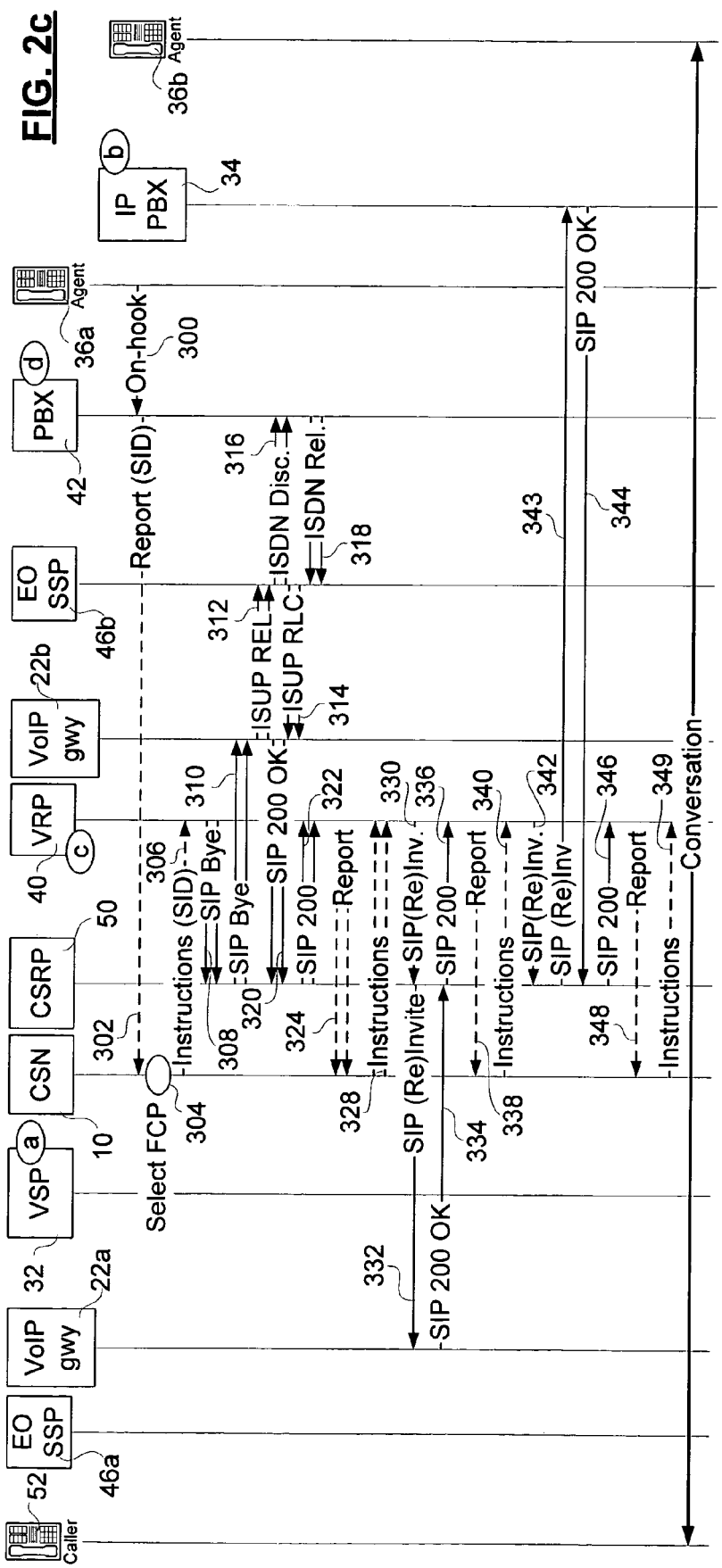
FIG. 2c is a schematic message flow diagram illustrating principal message and processing steps involved in optimizing a call between the caller and the remote agent to complete a consult transfer, using the system shown in FIG. 1.

However in the illustrated example, the agent 36a transfers the call to agent 36b, as is shown in FIG. 2c.

In step 300, after the agent 36a has conferred with remote agent 36b, the agent 36a places his/her telephone on-hook. In the illustrated embodiment, the agent does not specify that the call is going to be transferred. Rather, the CSN 10 may be provisioned to reconfigure the call path (with caller and consult call path legs) by default in view of the consult transfer previously requested by agent 36a.

When the PBX 42 detects the on-hook condition of the agent's 36a telephone, it releases the agent's telephone, updates a table of available agents in the enterprise call application, and sends an optimization connection change request to the CSN 10 (step 302).

On receiving the optimization connection change request, the CSN 10 determines a best FCP 30 in each of the legs of the call path to be used for reconnecting the remaining parties to the call. It should be noted that some FCPs 30 are only able to reconnect calls if both call legs pass through the FCP 30, and others may not be adapted to reconnect a call except by reconnecting the call legs to a conference resource. The CSN 10 is provisioned with tables indicating the capabilities of each FCP 30, and selects an appropriate FCP based on these hard constraints, as well as soft constraints imposed by service agreements etc., as previously explained. The CSN 10 may select a FCP 30 in both call legs that is provisioned to reconnect call legs, for example by virtue of connection through a facility that controls the bearer paths, such as a VoIP network, in a manner known in the art.

As shown in FIG. 2c the VRP 10 of the managed IP network 20 is selected (step 304) by the CSN 10. By reconnecting the VoIP gateway server 22a (to EC1) with the IP PBX 34, the call path can be reconfigured to remove a call path loop through EC2 between the VoIP server 22b (to EC2), and further releases resources used at PBX 42. Accordingly, the CSN 10 directs the VRP 40 to formulate and send two SIP Bye signaling messages to the CSRP 50 (step 308), one SIP Bye message for each of the call path legs to the PBX 42. As the call signaling paths for the two call legs between the VRP 40, and the IP PBX 34 are the same, the SIP Bye messages are shown grouped together, although it should be understood that these messages are independently transmitted. The SIP Bye messages are forwarded to the CSRP 50 (step 308), and to the VoIP gateway 22 (step 310), which converts the SIP Bye messages to ISUP Release (REL) messages, and forwards the REL messages (step 312) through the call legs within EC2. Receipt of the REL messages at the end office SSP 46b prompts the mandatory return of corresponding Release Complete (RLC) messages in reply (step 314), and the forwarding of ISDN disconnect messages (step 316) to the PBX 42 to tear down the connections over the leased trunk. The ISDN Disconnects are acknowledged with ISDN Release messages (step 318).

Meanwhile, the VoIP gateway 22 acknowledges the SIP Bye messages with corresponding SIP 200 OK messages (step 320). The SIP 200 OK messages are relayed by the CSRP 50 to the VRP 40 (step 322), prompting the VRP 40 to report to the CSN 10 the completions of the respective releases (step 324). The CSN 10 directs the VRP 40 to discard the SIP 200 OK messages, and to issue a SIP Re-Invite message to reconnect a first of the call path legs (step 328). It will be appreciated by those skilled in the art that the Re-Invite message is a SIP Invite message used to re-establish a connection.

A first leg of the reconnection is effected in steps 330–340, wherein the SIP Re-Invite message is forwarded from the VRP 40 to the CSRP 50 (step 330), and on toward the VoIP gateway 22a to EC1 (step 332). The VoIP gateway 22a effects the release of the bearer path of the call within the managed IP network 20 by releasing the RTP connection extending to the VoIP gateway 22b, and seizes a bearer connection to the IP PBX 34. The SIP Re-Invite message is acknowledged with a SIP 200 OK message, sent to the CSRP 50 (step 334,) and relayed to the VRP 40 (step 336). The bearer connection is then seized. In response, the CSRP 50 reports to the CSN 10, which returns instructions directing the VRP 40 to discard the SIP 200 OK message, and to re-invite the IP PBX 34 using analogous steps 342–349. Resulting in the IP PBX 34 seizing bearer channel capacity to the VOIP gateway 22a connected to EC1. When the SIP Re-Invite message is acknowledged (SIP 200 OK) the VRP reports to the CSN 10, informing the CSN 10 of the completion of the connection change. The CSN 10 returns instructions to discard the SIP 200 OK message (step 346). The bidirectional path between the IP PBX 34 and the VoIP gateway 22 is now operating to convey any voice traffic between the remote agent 36b, and the caller 52.

Blind Transfer

Figure 2D:
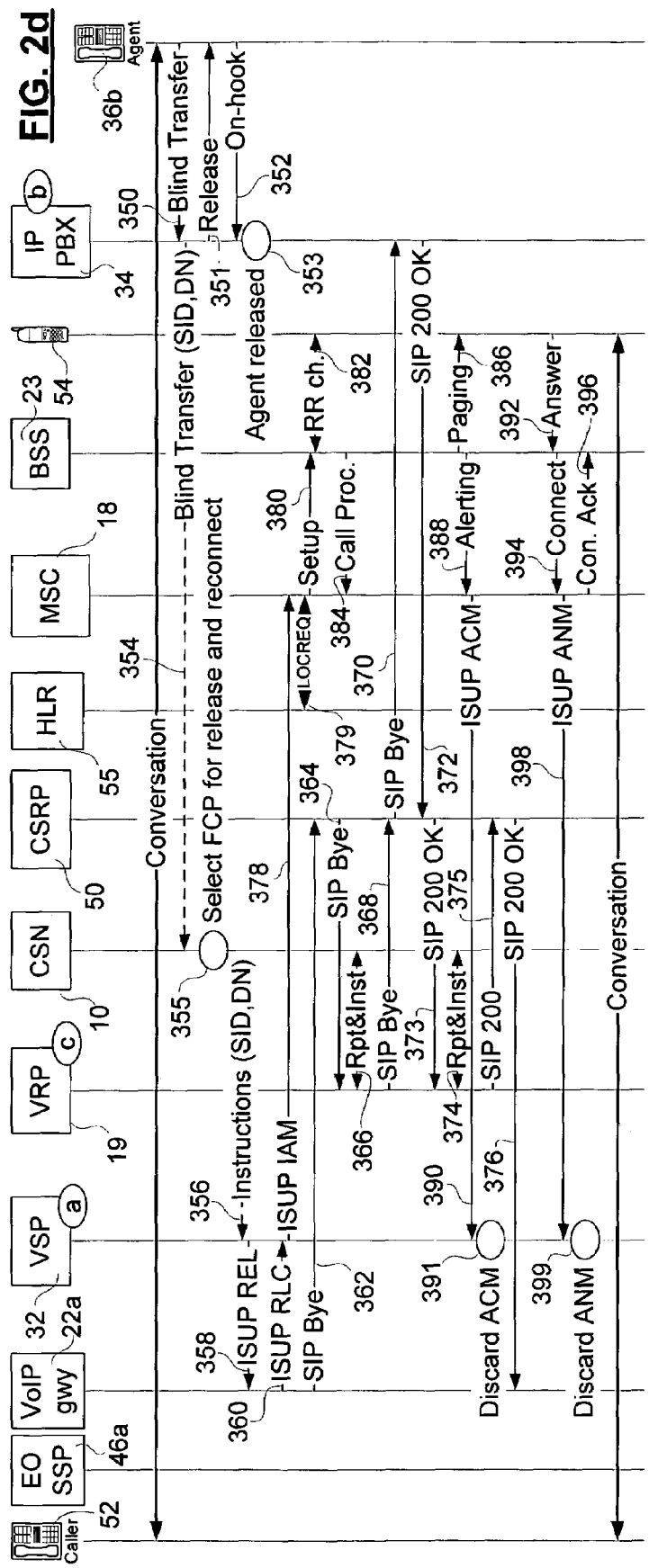
FIG. 2d is a schematic message flow diagram illustrating principal message and processing steps involved in effecting a blind transfer of the call from the remote agent to a third party, using the system shown in FIG. 1.

FIG. 2d schematically shows principal message and processing steps involved in effecting a blind transfer of a call initially established between the caller 52 and the remote agent 36b, as per the conclusion of FIG. 2c. In step 350, the remote agent 36b requests a blind transfer from the IP PBX 34. If the remote agent's 36b telephone is a SIP telephone, or other IP telephone, respective message types may be defined to signal the blind transfer connection change request, and these messages may or may not be acted on by the IP PBX 34, which may simply relay the connection change (blind transfer) request message to the CSN 10.

As shown in FIG. 2d, the IP PBX 34 releases the call and applies dial tone to the remote agent's line (step 351) until the agent places the telephone set on-hook. This on-hook condition is detected by the IP PBX 34 (step 352), prompting the updating of the availability information respecting the remote agent 36b (step 353). Subsequent to the blind transfer connection change request, the IP PBX 34 inserts the SID and a directory number (DN) or a termination address entered by the remote agent 36b into a request message of a prescribed format, and forwards the blind transfer request to the CSN 10 (step 354).

Upon receipt of the blind transfer request message, the CSN 10 selects a FCP 30 in the call path for releasing the existing call and reconnecting the call to the specified DN (step 355). The FCP 30 may be selected to minimize the cost of the call, minimize telecommunications resource utilization for the call by minimizing a number of switches and nodes in the call path after the change, to maximally or minimally use the enterprise telephone network equipment when available, or in accordance with any other criteria. In some embodiments, a plurality of selection criteria may be used for any connection change request, as a function of the requesting party, the type of connection change, etc. The selection may also be constrained by agreements between different parties. In accordance with this example the reconnection of the call is effected at VSP 32 (FCPa), which reduces the utilization of resources within the managed IP network 20.

In step 356, the CSN 10 directs the VSP 32 to release and reconnect the call. The forward release of the call is initiated with an ISUP REL message (step 358) that is forwarded along the call path between the VSP 32 and the VoIP gateway 22*a*, until it reaches the VOIP gateway 22*b*. At each SSP that receives the REL, trunk resources for the call are released, the REL is acknowledged with a release complete (RLC) message, and the REL is forwarded to a next SSP in the call path. The REL prompts the VOIP gateway 22 to release the trunk to EC1, return a RLC message (step 360), release the RTP bearer channel for the call, and forward a SIP Bye message along the call control path within the managed IP network 20. The SIP Bye message is forwarded to the CSRP 50 (step 362), to the VRP 40 (step 364) (where it is reported to the CSN 10 (step 366)), returned to the CSRP 50 (step 368), and relayed to the IP PBX 34 (step 370). The IP PBX 34 releases the bearer path connection used for the call, and returns a SIP 200 OK message in reply to the SIP Bye message, which retraces the call control path of the call within the managed IP network 20 (steps 372–376), completing the tear down of the call path between the VSP 32 and the IP PBX 34.

As soon as the call path from the VSP 32 is released (i.e. upon receipt of the RLC in step 360) the VSP 32 can re-extend the call path to the DN supplied in the instructions from the CSN 10, in order to reconnect the caller 52 to a cellular telephone 54 associated with the DN. In step 378 the VSP 32 sends an IAM addressed to the cellular telephone 54 containing the SID toward the SSP that supports the enhanced trunk in the call path. The IAM is forwarded hop-by-hop through the EC1 until it reaches gateway MSC 19, where it is translated and forwarded to MSC 18. In step 379 the MSC 18 queries a home location register (HLR 55) with a location request (LOC REQ) and receives location information associated with the cellular telephone 54 in response. In step 380 the MSC 18 forwards a Setup call signaling message to a base station system (BSS) 23 in radio contact with the cellular telephone 54. The BSS 23 establishes a radio resource channel with the cellular telephone 54 (step 382) in a manner well known in the art, and returns a Call Proceeding message (step 384) to the MSC 18.

The BSS 23 applies ringing to the cellular telephone 54 once the radio resource channel is established (step 386), and sends an Alerting message to the MSC 18 (step 388). The MSC 18 then returns an ISUP ACM through the reserved call path, which is relayed to the gateway MSC 19 (not shown) and back towards the SSP supporting the enhanced trunk associated with the VSP 32. In step 390 the ACM is received at the VSP 32, and on the instructions of the CSN 10 (messages not shown) the ACM is discarded (step 391). Likewise, when the cellular telephone 54 is answered (step 392), the BSS 23 (step 394) issues a Connect message to the MSC 18 (which is acknowledged in step 396), and an ISDN ANM is returned to the VSP 32 (steps 398), where it is discarded (step 399). The conversation between the cellular telephone user and the caller 52 is then supported by the call path.

Multimedia Network Embodiment

Figure 3:
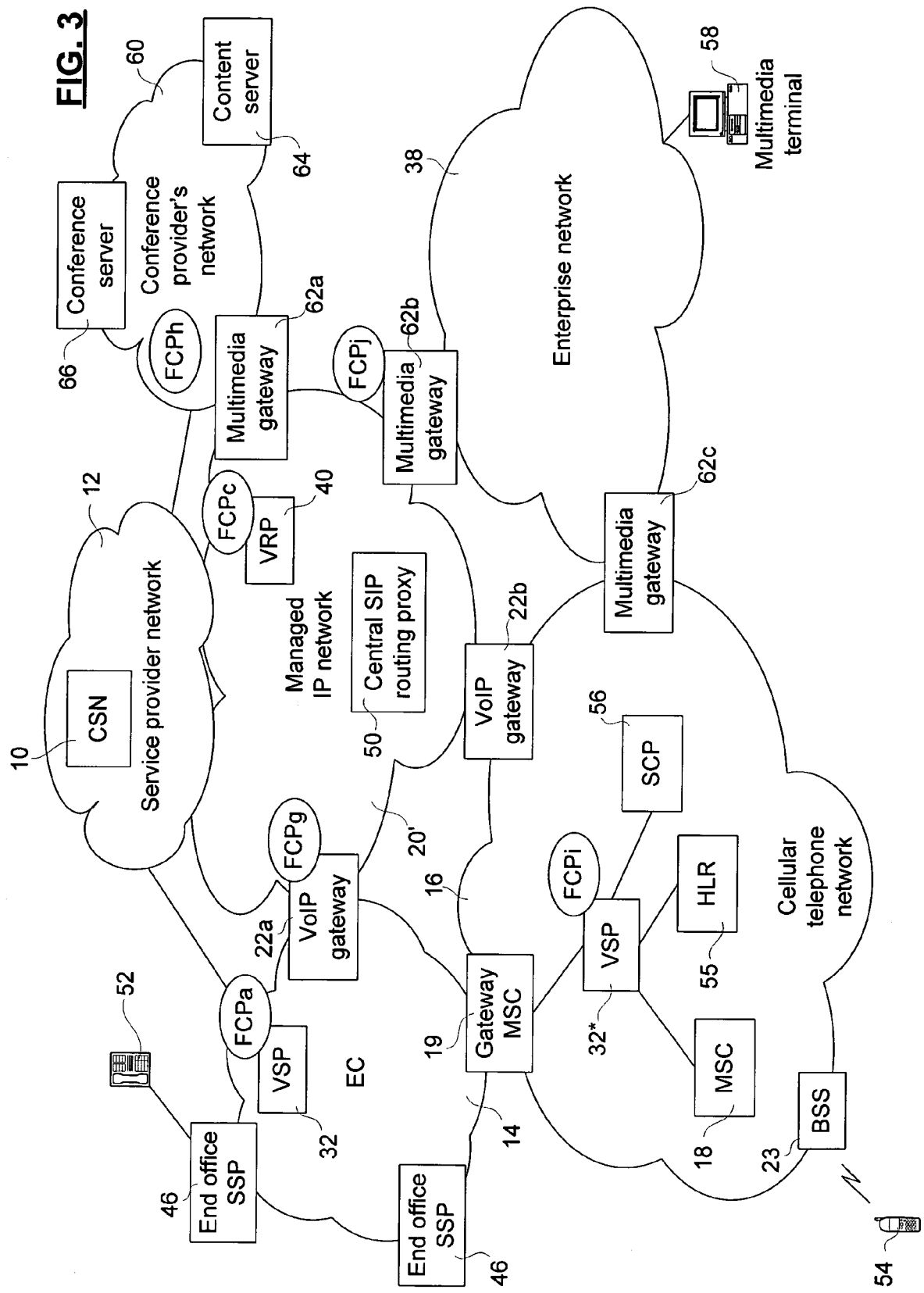
FIG. 3 is a schematic diagram illustrating an embodiment of the system in accordance with the present invention deployed in another exemplary configuration of interconnected communications networks.

FIG. 3 is a schematic block diagram of principal elements of a hybrid multimedia and telephone telecommunications network, featuring some of the same components shown in FIG. 1. It will be appreciated by those skilled in the art that elements of FIG. 1 have been identified with like numerals and their descriptions are not repeated.

The managed IP network 20' supports multimedia calls, such as those made between devices on the enterprise network 38 (including a multimedia terminal 58), multimedia-enabled mobile stations connected to the cellular telephone network 16, devices of a conference provider's network 60, etc. Using the cellular telephone network 16 the cellular telephone 54 can access the EC 14 via the gateway MSC 19, and the VoIP gateway 22*a* interconnecting the EC 14 with the managed IP network 20' has an analogous role for switching voice calls with bearer channels of the managed IP network 20', although it will be apparent that some mobile stations may access the managed IP network 20' directly via a multimedia gateway 62*a*, 62*b*, and yet others may use a Wireless Internet Service Provider (WISP) to access an Internet that provides other connection services.

The managed IP network 20' is connected to the enterprise network 38, the service provider network 12, the cellular telephone network 16, and the conference provider's network 60, permitting data connections of various types to be supported concurrently through the bearer channels. These data connections are set up using the SIP protocol, in a manner known in the art. Multimedia gateways 62 are edge routers that interconnect the managed IP network 20' to the conference provider's network 60, enterprise network 38, or cellular telephone network 16, for establishing multimedia calls thereacross.

The conference provider's network 60 includes a content server 64, and a conference server 66 that are used to provide a multimedia service, that provides access to audio, video and/or other content, and to content uploaded to the content server 64. Any number of other application provider networks can also be used in accordance with the invention, including voice and multimedia applications. The conference provider's network 60 also includes an FCPh function for calls made to the conference server 66.

FIG. 3 also shows a preferred embodiment of a virtual switching point (VSP) 32\* located within the cellular telephone network 16. As is well known by those skilled in the art, the cellular telephone network 16 is a modified switched telephone network that has switches (MSCs) that are adapted to establish, maintain and tear down calls to cellular telephones (54) that are free to roam within and between cells, in a manner well known in the art. One recent development in these networks is the introduction of mid-call triggers to permit various prepayment schemes to be centrally monitored. One of the mid-call triggers involves providing MSCs 18 with program instructions for sending an origination request query, or a routing information request to an authority, depending on whether a GSM protocol, or a CDMA protocol is used within the cellular telephone network 16. It is also well known in the art that a gateway MSC 19, upon receipt of a call addressed to a cellular telephone, queries a home location register (HLR) 55, which either determines whether the cellular telephone 54 is roaming, and returns a routing number to the gateway MSC 19 for enabling the MSC 19 to direct the call to a MSC 18 that can service the call. These two message functions can be leveraged to force selected calls to the VSP 32\*.

In accordance with the illustrated embodiment, the origination request query/send routing information request, and the HLR requests are directed to the VSP 32\* that is provisioned to intercept TCAP signaling between the MSCs and the HLR, etc. of the cellular telephone network 16. While it will be appreciated by those skilled in the art that a standard VSP could be used in a circuit switched network, and calls may be directed to the VSP using other means known in the art, the illustrated system provides an alternative method for routing calls to the VSP 32\*. Advantageously, using the VSP 32\* as a proxy for HLR queries minimizes changes to the cellular telephone network 16 needed to enable calls to be selectively routed to the VSP 32*, effectively re-using mid-call triggers and the basic call routing mechanism (HLR query) used by current cellular telephone networks.

Multimedia Call Setup

FIGS. 4a,b schematically illustrate steps involved in establishing a voice call to the conference facility, and in effecting a user equipment swap mid session to permit the user to access multimedia content for the conference.

In step 400 the cellular telephone user initiates a Send. As is well known in the art, this entails requesting a radio resource channel from a BSS 23 (not shown), and forwarding a service request to the BSS 23 on the allocated channel, when assigned. After the channel is assigned, the BSS 23 returns a Confirmation (step 402). The BSS 23 sends a signaling connection control part (SCCP) connection request to the serving MSC 18, and then forwards the dialed digits in a setup message, as is well known in the art. The setup message prompts the MSC 18 to send a TCAP query (mobile application part (MAP)) to the HLR 55 (or the like) indicating an origination attempt and requesting handling instructions (step 406). The TCAP query is sent to the VSP 32*, prompting the VSP 32* to report to the CSN 10 (step 407) and to receive instructions from the CSN 10 (step 409). Since the call is identified as one for which enhanced call services are to be applied, the CSN 10 selects a SID for the call (step 408), and instructions for forwarding the call to the VSP 32* are sent to the MSC 18 (step 410).

In step 412, the MSC 18 selects and reserves an enhanced trunk for the call, and in step 413, formulates and sends an ISUP IAM to the point code associated with the reserved trunk. The IAM is received by the VSP 32*, and is relayed to a switch at the other end of the enhanced trunk (step 414), which in this example is the gateway MSC 19. The gateway MSC 19 translates the dialed digits, reserves a trunk in EC 14 for the call, and forwards the IAM to an SSP at the other end of the reserved trunk (step 415), as per standard call processing. In a like manner the IAM is forwarded to the VoIP gateway 22a, which converts the IAM into a SIP Invite message, determines that the call is to be provided enhanced call services, and accordingly forwards the SIP Invite message to the VRP 40 (step 416). In step 417 the VRP 40 reports its presence in the call path to the CSN 10 and receives routing instructions in reply.

Upon receipt of the instructions, the VRP 40 forwards the SIP Invite message to the CSRP 50 (step 418), which in turn, routes the SIP Invite message to the multimedia gateway 62 in the conference provider's network (step 420). Assuming authentication and authorization is successful, the multimedia gateway 62 forwards the call (via its SIP proxy) to the conference server 66 (step 422). The FCPh 30 within the conference provider's network reports its presence within the call path to the CSN 10 (step 424), permitting the CSN 10 to add the FCPh 30 to the map of FCPs in the call path (step 426).

The conference server 66 acknowledges the SIP Invite message by returning a SIP 100 Trying message that is relayed back to the multimedia gateway 62 (step 428), to the CSRP 50 (step 430), to the VRP 40 (step 432) (which reports the SIP Trying message to the CSN 10, and receives instructions for proceeding, in reply (step 433)), and to the VOIP gateway 22 (step 434). The SIP 100 Trying message is used to signal the completion of call invitation within the managed IP network 20.

In step 435 the conference server 66 issues a SIP 180 Ringing message which follows the same path within the managed IP network 20 as the SIP Trying message that preceded it (steps 435–440). When the VOIP gateway 22 receives the SIP 180 Ringing message, it converts the message to an ACM, which is forwarded through the EC 14 to the gateway MSC 19 (step 441a), the VSP 32* (step 441b) (which reports to the CSN 10 and receives instructions from the CSN 10, in step 442), and finally to the serving MSC 18 (step 441c). The gateway MSC 19 sends an Alerting message to the cellular telephone 54 so that a ringback tone is played to the cellular telephone user (step 443).

In step 444 when the conference server answers the telephone call, a bearer channel for the call is allocated between the conference server and the multimedia gateway 62, and a SIP 200 OK message is relayed to the multimedia gateway 62 (step 444). The multimedia gateway 62, in turn allocates a bearer path for the voice connection to the conference server 66, and allocates a bearer path to the VoIP gateway 22 through the managed IP network 20. In steps 446–449, the SIP 200 OK message is relayed through the managed IP network 20 and is received at the VoIP gateway 22a, which allocates a bearer path to the multimedia gateway 62 for the call, and converts the SIP 200 OK message into an ISUP ANM. The ANM is forwarded through EC 14 and cellular telephone network 16 in steps 450a–c, with the exchange between the VSP 32* and the CSN 10 (step 451). The call is now established, and the user is presented with a voice menu for identifying a respective conference session, and for authentication and authorization of the user. Once this is successfully completed, the call is switched to the identified conference (step 452) and the user becomes a participant in the conference call.

In step 456 the user operates the cellular telephone 54 in order to issue a connection change request to the CSN 10. The request is received by the MSC 18 and forwarded over the cellular telephone network 16 to the multimedia gateway 62c (step 457) with the managed IP network 20, where it is relayed to the CSN 10. It will be appreciated by those skilled in the art that access to the CSN 10 via a public Internet would not necessarily pass through the managed IP network 20, and the connection change request may be sent to a multimedia gateway, Wireless Internet Service Provider gateway, or a public or private messaging network to achieve the same result.

The CSN 10 receives the switch device connection change request (step 460) and identifies the call path (step 462). The switch device request also includes a user identifier (UID) and may also include an identifier of the user device to which the call is to be switched. The CSN 10 also selects a FCP 30 within the call path to park the telephone call, and effect the user device switch. The CSN 10 selects the VRP 40, and accordingly instructions are sent to the VRP 40 (step 468) to disconnect the leg of the call path that extends to the cellular telephone 54.

Accordingly, in step 470 the VRP 40 sends a SIP Bye message to the VoIP gateway 22 to initiate the tear down of the call path leg to the cellular telephone 54. The SIP Bye message is received at the VoIP gateway 22, prompting the release of the bearer channel reserved through the managed IP network 20 to the multimedia gateway 62 (conference provider's network 60). The SIP Bye message is converted to a REL message that is relayed through the EC 14 until the REL message is received at the MSC 18, each REL message being acknowledged with a corresponding RLC, (steps 472a–d) in a manner well known in the art, and the call release is reported by the VSP 32* (step 474).

After the VoIP gateway 22a receives the RLC in step 472a, a SIP 200 OK message is returned to the VRP 40, acknowledging the SIP Bye message. The VRP 40 subsequently sends a report to the CSN 10 and receives instructions from the CSN 10 (step 478). In response to the instructions, the VRP 40 discards the SIP 200 OK message (step not shown), and holds the call until the user resumes the call from another device.

Figure 4B:
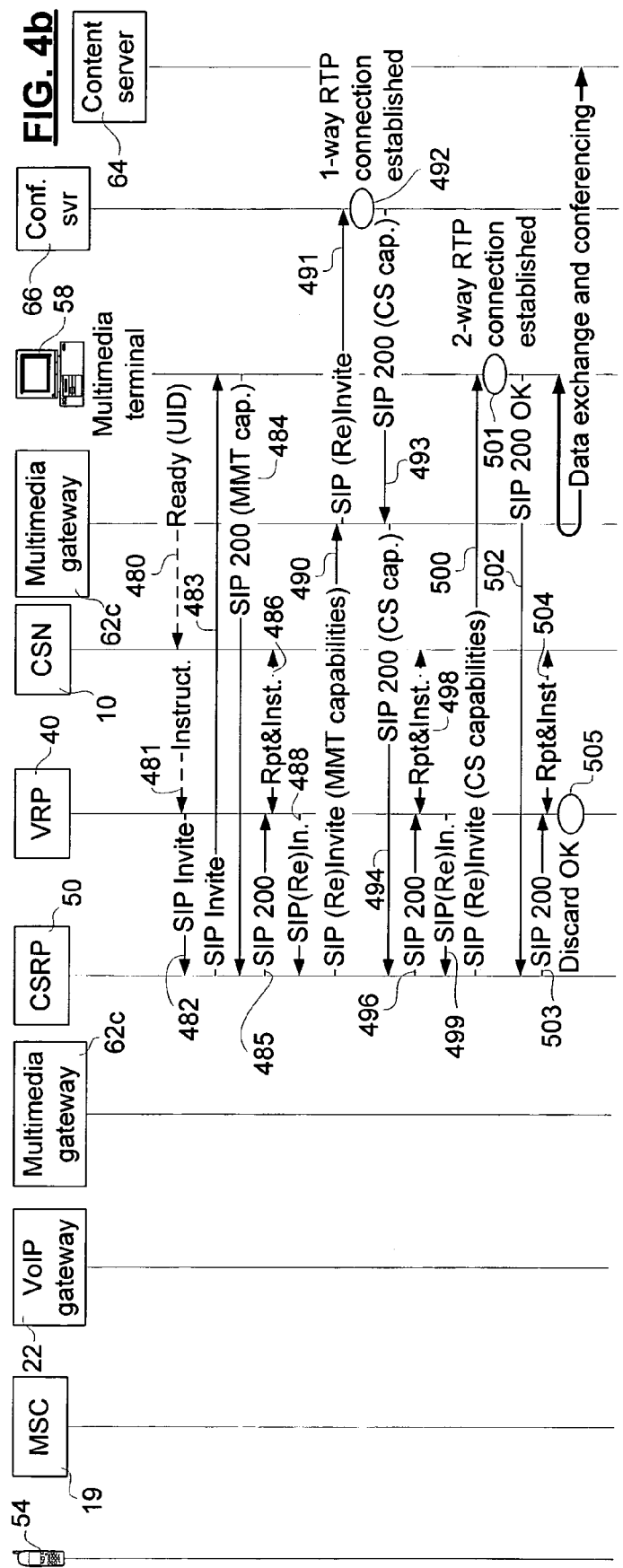

As shown in FIG. 4b, in step 480 the user uses the multimedia terminal 58 to send a ready message, which includes the user ID to permit the CSN 10 to authenticate the user. The ready message is routed over the Internet to the CSN 10. The CSN 10 accordingly sends instructions to the VRP 40 (step 481), to direct the re-establishment of the connection between the multimedia terminal 58 and the multi-media conference.

In step 482 the VRP 40 sends a SIP Invite message, which is forwarded by the CSRP 50 to the enterprise network 38, where it is routed to the multimedia terminal 58 (step 483). The invite is received at the multimedia terminal 58 prompting the multimedia terminal 58 to return a list of multimedia capabilities for the session to the CSN 10 in a reply (SIP 200 OK), which is returned through the enterprise network 38, to the CSRP 50 (step 484), where it is relayed to the CSN 10 (step 485).

When the multimedia capabilities of the multimedia terminal 58 are received at the CSN 10 (step 484), the CSN 10 directs the VRP 40 to formulate and send a SIP Re-Invite message to the CSRP 50, the SIP Re-Invite message contains the multimedia capabilities of the multimedia terminal 58. The SIP Re-Invite message is sent to the CSRP 50 (step 488), forwarded to the multimedia gateway 62a (step 490), and then sent to the conference server 66 (step 491). The conference server 66 establishes a unidirectional RTP connection for the traffic from the conference session to the multimedia terminal 58 (step 492), and acknowledges the SIP Re-Invite with a SIP 200 OK message (step 493) containing the capabilities of the conference server 66. The SIP 200 OK message is relayed by the multimedia gateway 62 (step 494) to the. CSRP 50, and from there to the VRP 40 (step 496), which reports to the CSN 10 and receives instructions from the CSN 10 (step 498).

In step 499 the VRP 40 issues a SIP Re-Invite message to the multimedia terminal 58 to supply the multimedia parameters for the call assigned by the conference server 66. The SIP Re-Invite message is forwarded by the CSRP 50 (step 500) through the enterprise network 38 to the multimedia terminal 58. The SIP Re-Invite messages prompts the multimedia terminal 58 to establish a bidirectional connection for the call to the conference server 66 (step 501), and to acknowledge the SIP Re-Invite message by returning a SIP 200 OK message (step 502). The SIP 200 OK message is returned via the enterprise network 38 and the CSRP 50 (step 503) to the VRP 40. The VRP 40 reports the SIP 200 OK message to the CSN 10 (step 504), and is instructed to discard the SIP 200 OK message (step 505). The multimedia communications path between the multimedia terminal 58 and the conference and content servers is now available for data exchange. It will be appreciated by those skilled in the art that data from the content server may include audio and video communications from the conference participants, in a manner known in the art.

In accordance with this example, the user joins the conference and participates to a voice-limited extent, and then when desired or required, switches user devices and participates using the multimedia terminal 58. Advantageously the switch does not require the reentry of conference identifiers and authentication information.

Multi-Service Embodiment with Specially Provisioned VSP

Figure 5:
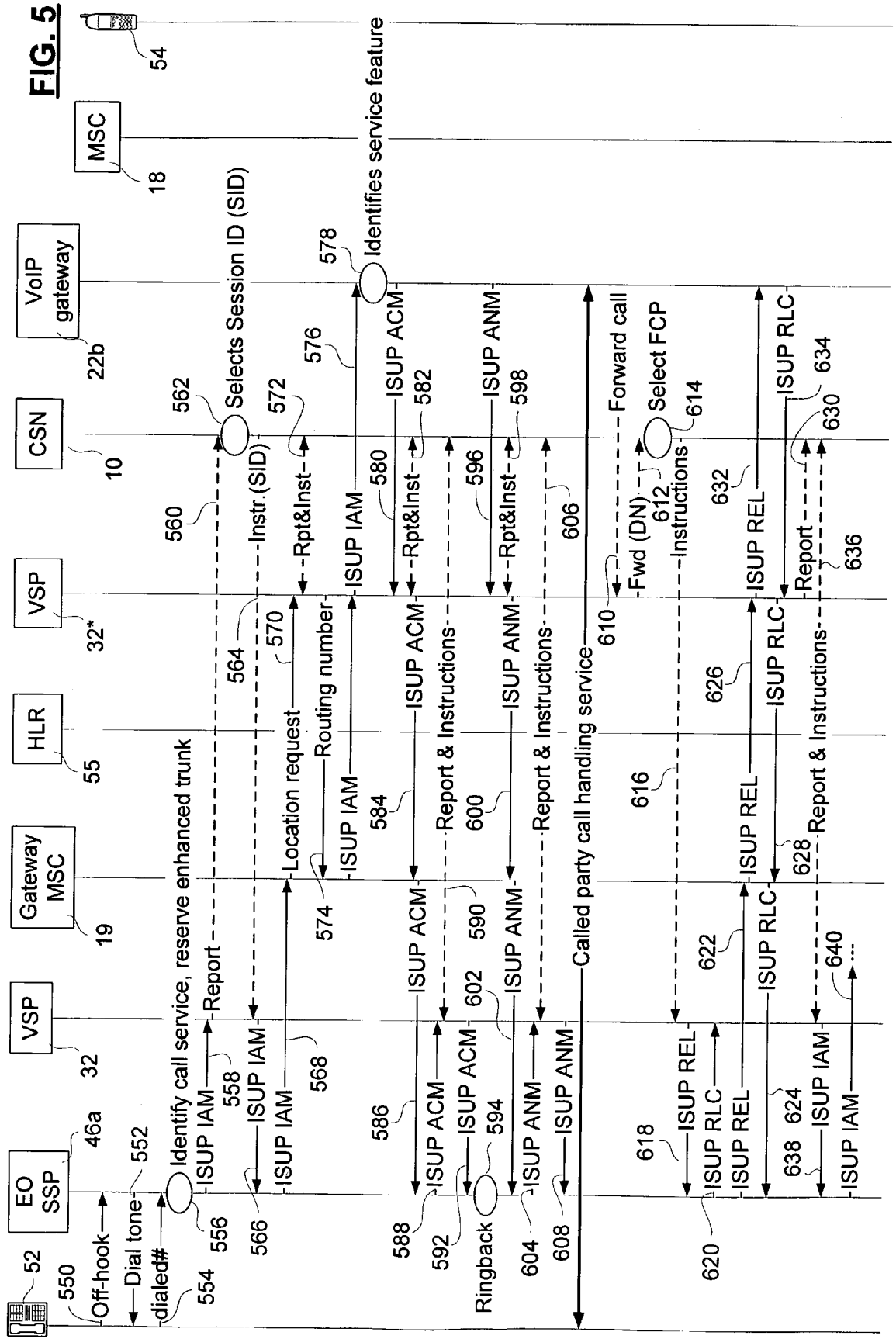
FIG. 5 is a schematic message flow diagram illustrating principal message and processing steps involved in forwarding a call by a conference participant to original user equipment using the system shown in FIG. 3.

FIG. 5 is a message flow diagram showing how the invention may be applied to calls between two telephone users who subscribe to different enhanced services. The example further illustrates the operation of specially provisioned VSP 32* adapted to leverage call processing features of a cellular telephone network.

In step 550, caller 52 takes a telephone handset off-hook. The end office SSP 46 serving the telephone's subscriber line detects the event, and applies a dial tone to the subscriber line (step 552), prompting the caller 52 to enter dialed digits of a directory number or a termination address. The end office SSP 46 identifies the call (by either the subscriber line or the dialed digits, or both) as a call for which an enhanced service is to be applied, and consequently reserves an enhanced trunk (associated with VSP 32) for the call. In the illustrated embodiment, the enhanced trunk seized is a loop-back trunk. The end office SSP 46 formulates and sends an IAM to the point code of the VSP 32, which is associated with the enhanced loop-back trunk (step 558).

On receipt of the IAM, the VSP 32 reports the call to the CSN 10 (step 560). As described above, the CSN 10 generates an SID for the call (step 562), and returns instructions to the VSP 32 (step 564), directing the VSP 32 to forward the IAM to the opposite end of the loop-back trunk, with the SID inserted in the UUI field. In step 566 this is done, prompting the end office SSP 46 to translate and forward the IAM through the EC 14. The IAM is received at the gateway MSC 19 (step 568), prompting the gateway MSC 19 to query the MSC's 18 HLR 55 for a point code of the MSC currently serving the cellular telephone 54 using a location request (step 570). The location request is sent to the VSP 32* which serves as the HLR 55, and the VSP 32* inspects the request, determines that because of the destination address of the call, a service feature is to be applied to the call, and forwards a content of the request to the CSN 10 (step 572). The CSN 10 returns instructions to the VSP 32*. (step 574).

The instructions direct the VSP 32* to return a routing number, which is a directory number or a termination address of an interactive voice response (IVR) unit associated with the VOIP gateway 22b. The IAM is forwarded to the VoIP gateway 22b (step 576) and the IVR identifies a subscriber and the service feature to apply to the call (step 578). The association of the call with the subscriber and the service feature may be performed by correlating an identifier within the IAM with a record in a subscriber profile database in a number of ways well known in the art, or alternatively, may be performed using the routing number. The IAM may contain the dialed digits, for example using the redirecting number field in a manner well known in the art, which may likewise be used to associate the call with the subscriber and/or the service feature.

In step 580 the VoIP server 22b returns an ISUP ACM to the VSP 32*, prompting a report to the CSN 10 and receipt of instructions from the CSN 10 (step 582), and the relay of the ACM to the gateway MSC 19 (step 584), and through. EC 14 to end office SSP 46 (step 586), to the VSP 32 (step 588) (prompting another report to the CSN 10 and receipt of routing instructions (step 590)), and finally back to end office SSP 46 (step 592), prompting the end office SSP 46 to cut through connections so that ringing is heard on the subscriber line (step 594). In a similar manner, when the IVR unit answers the telephone call, ISUP ANMs are returned through the call path, with the exchange of reports and instructions with the FCPs along the way (steps 596–608), completing the establishment of the call to the IVR unit.

The IVR unit applies a call handling service (call screening, call forwarding, etc.) on behalf of the called party, at the conclusion of which the IVR unit determines that the call is to be forwarded to an identified directory number (DN) or termination address. In step 610 the IVR unit sends a message to the CSN 10 (step 612).

The CSN 10 receives the forward call connection change request, and selects a FCP to effect the change. The VSP 32 is selected and in step 616 the CSN 10 sends instructions to the VSP 32, directing the VSP 32 to release the forward leg of the call path. In step 618, the VSP 32 forwards a REL to the next switch in the forward call path, as per normal call release procedures. In this manner the call path is released through the EC 14 until, in step 618 the REL message is received at the gateway MSC 19. The gateway MSC. 19 releases trunk resources for the call, acknowledges the REL message with a RLC message (step 620), and forwards the REL message to the VSP 32\* (step 622). The VSP 32\* releases the trunks, acknowledges the RLC message (step 624), reports the exit of the VSP 32\* (step 626) from the call path associated with the SID (step 630), and forwards the REL message (step 628) to the VOIP gateway 22b (step 632). On receipt of the RLC message, the VOIP gateway 22b releases the trunk resources and acknowledges the REL message with the mandatory RLC message (step 634).

The VSP 32 reports the successful completion of the release instruction to the CSN 10, and receives instructions in reply (step 636). The instructions direct the VSP 32 to forward an IAM addressed to the DN. The VSP 32 formulates and forwards an IAM as per normal telephone call handling (step 638), with the exception that when ACM and ANM messages are received at the VSP 32, the CSN 10 directs the VSP 32 to discard them.

The invention has been described with reference to a system, apparatus and exemplary methods used to reconfigure a telephone call using a selected feature control point within a call path that extends through multiple carrier networks of different types. It will be appreciated by those skilled in the art that the illustrated service features and call flows are merely examples and that the selection of a feature control point in a call path may be accomplished in different ways.

The embodiments of the invention described above are therefore intended to be exemplary only. The scope of the invention is therefore intended to be limited solely by the scope of the appended claims.

We claim:

1. A method for reconfiguring a communications call, comprising:
   receiving at a call service node (CSN) a report from at least two feature control points (FCPs) in a call control path set up for the call across at least two different communications networks;
   receiving at the CSN a connection change request, the connection change request including information for identifying the call and how the call is to be changed;
   selecting at the CSN one of the FCPs to effect the requested connection change in accordance with a predetermined criterion; and
   sending instructions from the CSN to the selected FCP to effect the requested connection change to the call.

2. The method as claimed in claim 1 further comprising sending call processing instructions from the CSN to one or more FCPs involved in the call, the call processing instructions providing the one or more FCPs with information about handling a call control signaling message.

3. The method as claimed in claim 1 further comprising using the reports to map the call control path across the at least two different communications networks.

4. The method as claimed in claim 1 further comprising on receipt of a first one of the reports from a first FCP in the call control path, generating a call session identifier (SID) for the call and returning the SID to the first FCP with instructions to insert the SID into a call signaling message that caused the first one of the reports to be sent to the CSN.

5. The method as claimed in claim 4 wherein generating the SID for the call comprises selecting a SID from a predefined set of SIDs.

6. The method as claimed in claim 5 wherein selecting the SID further comprises selecting a SID uniquely associated with the first FCP.

7. The method as claimed in claim 1 wherein receiving the connection change request further comprises receiving the connection change request directly from one of the party to the call and a third party control via a parallel network, and the information for identifying the call includes one of a directory number and a termination address of the party to the call.

8. The method as claimed in claim 4 wherein receiving the connection change request further comprises receiving a connection change request from an FCP in the call control path in response to an indication received from the party to the call that the change in connection is requested, and the information for identifying the call includes the SID.

9. The method as claimed in claim 8 wherein the indication received by the FCP comprises one of:
   receiving a dual tone multifrequency (DTMF) signal retrieved from one of a bearer path and a service node involved in the call;
   receiving a message sent by the calling party from a telephone involved in the call; and
   receiving a message sent by the calling party via a parallel network.

10. The method as claimed in claim 1 wherein receiving the connection change request further comprises receiving a request that a call to one of a directory number and a termination address be established between at least one of the parties to the call, and the connection change request further includes the one of a directory number and a termination address and an indication of a type of the reconfigured call.

11. A call service node (CSN) for reconfiguring communications calls, comprising:
   service logic that receives reports from a plurality of feature control points (FCPs) in different communications networks, each of the reports indicating that the sending FCP is in a call control path of a one of the calls;
   service logic that receives connection change requests from parties connected to respective ones of the calls, each connection change request including information for identifying the call and how the call is to be changed; and
   service logic that responds to a connection change request by selecting one of the FCPs in the call control path to effect the requested connection change in accordance with a predefined criterion, and sends instructions to the selected FCP to direct the FCP to effect the requested connection change.

12. The CSN as claimed in claim 11 further comprising:
service logic that receives in the reports from the FCPs at least selected content of call control signaling messages received by the FCPs; and
service logic that sends in reply to the reports call processing instructions for indicating how the FCPs should handle the call control signaling messages.

13. The CSN as claimed in claim 12 further comprising:
service logic that inspects a report associated with a call control path to determine whether a service identifier (SID) is contained in the report;
service logic that maps an FCP that sent the report with a call control path identified by the SID, if the SID is contained in the report;
service logic that selects a SID if a SID is not contained in the report; and
service logic that sends the selected SID to the FCP that sent the report with instructions that the FCP is to insert the SID in a reported call control signaling message before the call control signaling message is forwarded along the call control path.

14. The CSN as claimed in claim 13 further comprising service logic that directs the FCP that sent the report to insert the SID into a field in the call control signaling message.

15. The CSN as claimed in claim 11 further comprising:
service logic that determines whether the connection change request was sent directly from the party to the CSN, or from a FCP in the call control path for the CSN;
service logic that extracts the SID from the connection change request to associate the connection change request with the call if the connection change request was sent from a FCP; and
service logic that uses other information included in the connection change request to identify the call if the connection change request was sent directly from the party.

16. A system for reconfiguring communications call paths, the system comprising:
a plurality of feature control points (FCPs) in different telecommunications networks for controlling calls to effect connection changes to the calls; and
a call service node (CSN) provisioned to: receive a report from an FCP each time the FCP receives a call control signaling message associated with a call; to receive connection change requests, each connection change request including information for identifying the call and indicating how the call is to be reconfigured; to select one of the FCPs, from which a report was received indicating that the FCP is in a call control path of the call, for reconfiguring the call based on a predefined criterion; and to send instructions to the selected FCP to effect the requested connection change.

17. The system as claimed in claim 16 wherein the FCPs further comprise at least one of the following:
a virtual switching point in a circuit switched telephone network that handles call control signaling messages under control of the CSN;
a virtual routing point in a packet switched network that handles call control signaling messages under control of the CSN; and
customer premise equipment adapted to distribute calls as directed by a call application that is in communications with the CSN.

18. The system as claimed in claim 16 wherein the CSN receives the connection change request from the party to the call, and identifies the call using information associated with the call included in the connection change request.

19. The system as claimed in claim 16 wherein the CSN receives the connection change request from a FCP and identifies the call using a service identifier (SID) in the service change request.

20. The system as claimed in claim 16 wherein the CSN is provisioned to provide instructions to a FCP each time a report is received from the FCP, the instructions dictating how the FCP is to handle the call control signaling message.

* * * * *